US006877341B1

(12) United States Patent
Hong

(10) Patent No.: US 6,877,341 B1
(45) Date of Patent: Apr. 12, 2005

(54) METHOD FOR CONTROLLED SURFACE SCRATCH REMOVAL AND GLASS RESURFACING

(75) Inventor: Shane Y. Hong, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 54 days.

(21) Appl. No.: 10/058,575

(22) Filed: Jan. 28, 2002

Related U.S. Application Data

(60) Provisional application No. 60/264,507, filed on Jan. 26, 2001.

(51) Int. Cl.[7] ............................ C03C 27/00; C03B 29/00
(52) U.S. Cl. .................................. 65/28; 65/65; 65/104
(58) Field of Search ............................ 65/28, 65, 120, 65/104, 252, 284

(56) References Cited

U.S. PATENT DOCUMENTS

| | | | | | |
|---|---|---|---|---|---|
| 2,186,647 | A | * | 1/1940 | Lowd, Jr. et al. | 65/152 |
| 2,922,869 | A | * | 1/1960 | Giannini et al. | 219/75 |
| 3,188,190 | A | * | 6/1965 | Armstrong | 65/104 |
| 3,259,480 | A | * | 7/1966 | Michalik et al. | 65/28 |
| 3,534,272 | A | * | 10/1970 | Menear | 65/33.8 |
| 3,811,857 | A | * | 5/1974 | Deeg et al. | 65/65 |
| 3,876,149 | A | * | 4/1975 | Futerko | 239/398 |
| 4,576,571 | A | * | 3/1986 | Moufflet et al. | 432/9 |
| 5,595,583 | A | * | 1/1997 | Murnick | 65/350 |

FOREIGN PATENT DOCUMENTS

| JP | 6-16440 | * | 6/1994 | ........... C03B/29/00 |

* cited by examiner

*Primary Examiner*—Steven P. Griffin
*Assistant Examiner*—Carlos Lopez
(74) *Attorney, Agent, or Firm*—Baker Botts LLP

(57) ABSTRACT

Disclosed are a method and system for removing scratches from a planar panel of translucent or transparent material, such as glass, without removal from its frame. A heat source supplying a controlled amount of heat is moved across the surface of the planar panel at a controlled velocity and at a controlled distance from the surface so as to progressively melt a thin surface layer at portions of the surface heated by the moving heat source. The melted material re-flows under surface tension to smooth scratches in the surface layer. Movement of the heat source is repeated over different portions of the surface until all scratched areas have been treated. The treated panels have a smooth surface with scratches removed, and have good optical and structural qualities.

14 Claims, 11 Drawing Sheets

METHOD FOR CONTROLLED SURFACE SCRATCH REMOVAL AND GLASS RESURFACING

This application claims priority from U.S. provisional application Ser. No. 60/264,507, filed Jan. 26, 2001.

FIELD OF THE INVENTION

This disclosure relates to a method and system for removing scratches from planar panels of translucent or transparent materials, including those composed of glass and similar substances. Panels of glass or polycarbonate used in windows and doors in subway cars and other public places are often subject to scratching of their surfaces by vandals in the creation of graffiti or through ordinary wear. Due to the high cost of removal and replacement or refabrication of these scratched panels, subways and other property owners are often forced to leave the damaged panels in place. The present invention addresses this problem by providing a method and system that allows for the expedient and environmentally safe removal of scratches from these panels without removal of the panels from their frames.

BACKGROUND OF THE INVENTION

Graffiti vandalism in public transit systems and city neighborhoods is a serious problem. While public transit authorities and city governments have largely conquered paint and ink graffiti, a new type of graffiti vandalism has emerged—the scratching/etching of polycarbonate and glass windows, called "scratchitti." As with the paint and ink graffiti, "scratchitti" damages the external appearances of structural materials. However, unlike paint graffiti, the scratches cannot be removed or hidden and cause permanent damage.

Scratchitti vandalism is a major problem for the New York City Transit (NYCT) System, which currently operates 5,792 passenger railcars and provides service 7 days a week, 24 hours a to approximately 1.1 billion riders a year. NYCT has operated a graffiti free fleet since May 1989. They can remove paint or ink graffiti markings from cars within twenty-four (24) hours. However, they cannot correct the damage from the scratches/etches on polycarbonate and glass windows, samples of which are shown in FIG. 1. Currently, the prevalence of scratchitti is high; it is believed to be on almost every window and door of every rail car of New York City's (NYC) subway lines. NYCT has approximately 174,000 pieces of glass in the subway fleet. It has been estimated that to run a scratch-free fleet, NYCT would have to spend $60–70 million per year to replace window and door glass. At the present time, NYCT replaces glass only when it is too scratched to see through, or when it has obscenities or racial slurs etched into it. In 1997, NYCT replaced approximately 62,000 pieces of damaged glass for a material and labor cost of $2.6 million.

Scratchitti is not limited to subways. Windows and doors (often large and expensive) of private cars, public buses, bus shelters, residential homes, and business buildings also suffer severely from this type of vandalism. Without an easy method for removing this graffiti, property owners face a costly situation. Scratches to glass or polycarbonate panels may take months to remove using ordinary methods, and some require major engineering efforts costing thousands of dollars.

The present invention presents an environmentally benign and novel re-manufacturing process for removing scratches in planar panels of translucent or transparent materials including glass and possibly polycarbonate. This invention allows damaged windows/doors to be reused, thereby eliminating waste disposal of replaced glass. By effectively removing scratches, the process reduces disposal and replacement costs, saves natural resources, and helps to create a more pleasant living environment. This process can also help to improve safety, as it is appropriate for renewing the surface wear of canopies of aircraft and machinery.

In the early 1980s, polycarbonate windows were first installed in railcars and solved the problem of glass window breakage. However, it was discovered that polycarbonate panels could be easily scratched with anything from knives to paper clips. Vandals made heavy use of this new medium, and polycarbonate windows were being replaced in epidemic proportions. Later, a new type of impact resistant glass that met FRA requirements and was more resistant to scratches was developed and installed on the railcars. Although this new type of glass is more scratch resistant, vandals also modified their art using tools ranging from emery cloths to diamond dust encrusted pen styluses to scratch these new windows. Since manufacturing unscratchable glass is technically impossible, many organizations have investigated potential methods to remove the scratches, such as grinding/polishing the scratches, applying plies of Mylar film (polyester film) to the glass, and patching with clear polymer coating. To date, no readily-workable solution has been identified.

Grinding/polishing operations require that the panel be removed from the frame for the scratches to be polished out. Attempts to polish/grind the scratches at NYCT facilities were very labor intensive. Thus the windows are instead shipped to a vendor who polishes the panel to remove the scratches. However, deep scratches cannot be removed without impairing the integrity of the panel. This process requires removing the damaged window and replacing it with a new or repaired window, accruing labor, material, and storage costs.

The process of covering windows with plies of Mylar (polyester) film is slightly more beneficial. The film can be applied to the window while it is in place in the frame. For the most part, the film protects the window pane from being scratched. However, because the film itself is more susceptible to scratching than the glass, it must be replaced often, which again results in a material and labor costs. Moreover, this approach cannot restore glass windows already scratched or etched.

When epoxy or polyurethane coatings are applied to the glass, scratches are successfully filled in and seemingly disappear. However, the window has to be removed from the frame because the coating must be applied to the glass when it is in a horizontal position. Applying the coating vertically results in the material dripping and running. The coating also must be applied in a clean environment to prevent dust and dirt from being embedded in the coating, which means the windows must be shipped to the vendor, having clean room facilities. When the coating becomes scratched, the window again must be removed, and to ensure compliance with flammability regulations, the first coating is removed before another coating is applied. Again this is a labor and material-intensive process.

Based upon the above prior art, optimum requirements for a workable solution to the "scratchitti" problem include:

Optimally, glass repair should be carried out while the glass is in the frame on the railcar, building or other structure;

The repair/protection process should not be labor intensive and should allow for completion within a period on the order of a fraction of an hour;

If the window must be removed from the frame the repair/replacement time should be less than one hour;

The repaired/protected glass must be able to fit back into the window frame;

The structural integrity (impact resistance, strength) of the glass should not be substantially impaired by the repair/protection process;

The optical quality of the treated glass should not be substantially different from that of the original glass;

There should be no substantial distortion, dripping, or running of panel materials;

Any coating used must meet flammability and smoke toxicity requirements;

The repair/protection process should not add significant weight to the panel;

Any coating/film used should not be readily detectable—no edges should be apparent;

The protective process should substantially maintain the scratch resistance of the original panels;

Any coating/film used should be resistant to the cleaners and solvents used to clean and maintain the surfaces.

The prior art is not believed to meet these optimal needs.

SUMMARY OF THE INVENTION

The present invention applies a method for removing scratches from planar panels of translucent or transparent material such as glass by controlled surface scratch removal of the surface portion of the panel such that a surface layer of the substance melts and re-flows the surface, returning the panel to a smoothly finished and optically transparent state. The process substantially maintains the strength of the material and causes minimal distortion. The process not only has implications for treatment of glass, but could have applicability for other transparent or translucent window or door materials as well, such as polycarbonate.

The approach used in the present invention, called controlled surface scratch removal, incorporates a technique of localized softening and surface tension. Intensive heat is positioned near the scratch marks on the glass panel. The heat melts a thin layer of glass into liquid, or changes the glass's viscosity to a flowable state. The layer has a thickness equal to or slightly larger than the depth of the scratches. Typically, the depth of the scratches ranges from about 400 to about 600 microinches; in some cases the depth ranges from 1000 to 4000 microinches. The glass is melted to a level close to the depth of the scratch, and allowed to cool naturally. During the cooling process, the surface tension of the melted glass will restore smoothness to the previously scratched surface. After cooling and without grinding or polishing, the panel surface will be as even and smooth as it was originally.

Distortion of the glass panel during the process is substantially prevented by keeping it solidly and structurally sound, except for the thin surface layer being repaired. When well controlled, this operation can be applied not only to a glass panel placed horizontally, but also vertically, thus allowing for repair of glass panes while still framed in windows or doors of subway cars. The restoration of the panes while still framed within windows and doors can provide a benefit of substantial time savings.

Glass is generally shaped at elevated temperatures at which the viscosity can be controlled. The properties of these substances make this approach highly feasible. Glass has a low thermal expansion coefficient (0.54 to $9 \times 10^{-6}$ cm/cm °C.). Local heating will not crack the glass if a proper heating protocol is followed. The method of the present invention was developed by experimental as well as numerical/analytical tools. Glass has a low thermal conductivity (1 to 3 W/m °C.) as well as a low thermal diffusivity. These properties allow a heated surface of a glass panel only a short period of time to reach a surface temperature hot enough to cause the scratched surface to reflow while ensuring that the temperatures in the bulk portions of the panels do not exceed values at which softening sufficient to cause deformation can occur.

The process set forth in the present invention renews old glass with or without scratch marks. This process can restore an amount approaching one hundred (100) percent of the surface smoothness and optical transparency with no chemical waste, no glass disposal, and no protective film requirements. Since no film or coating is necessary, there is no additional concern regarding flammability and toxicity requirements or potential for any adverse reactions with solvents and cleaners which are used to clean and maintain the surfaces. Additionally, this process does not reduce the amount of material in the glass panel and therefore potentially weaken the panel structure, as is the case with a grinding process. Nor does it produce any grinding debris or powder to contaminate the environment. Furthermore, this process does not yield waste from glass scrap or removal of protective film.

The present invention provides a quick, easy, and environmentally safe process which removes scratches from glass or polycarbon surfaces and restores high optical transparency. This approach reduce costs for labor, materials, and waste produced by conventional repair and replacement methods.

DETAILED DESCRIPTION OF PREFERRED EMBODIMENTS OF THE INVENTION

Figure 1A:
FIG. 1 depicts examples of glass scratch graffitti on the New York City subway system.
Figure 1B:
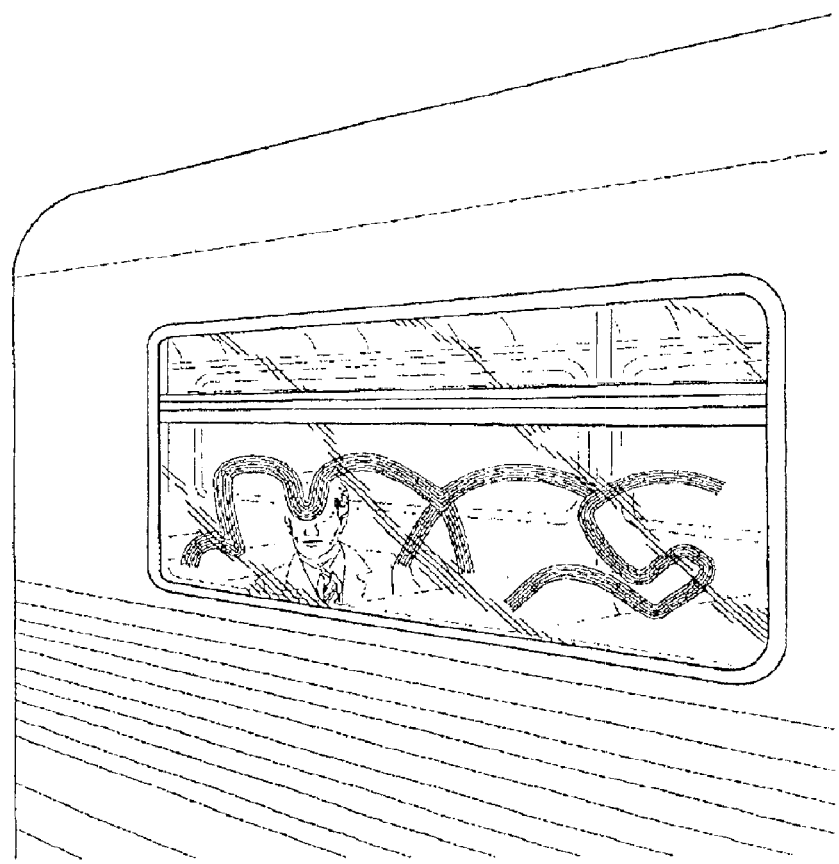

The Embodiment of the Heat Source Component

There are a number of different types of heat sources that could be used for melting glass, including electrical, laser, and traditional fuel gas torch. The gas torch is perhaps the cheapest, most accessible heat source. Hence, in one preferred embodiment of the present invention, heat sources are based on hydrocarbon gas combustion.

The gas torch determines the temperature distribution configuration and heat delivery rate at the glass surface. In one embodiment of the invention, a linearly extending heat source travels at a substantially constant rate over the surface of the planar panel, preferably along an axis which is not parallel to the length of the heat source, more preferably along an axis substantially perpendicular to the length of the heat source. In another embodiment of the invention, the torch tips are made from ceramic. Ceramic tips are advantageous over metal tips since metal tips my be eroded by the flame.

There are two basic choices of torch design: premixed and diffusion flame torch. The ideal torch for the application would be supply flame in an infinitely thin line extending from one edge of a rectangular glass pane to the other, and would produce temperatures at the glass surface of around 1200° C. and a sharp temperature change in the direction perpendicular to the glass surface. Such a torch would minimize the volume of glass heated above $T_g$ (the glass transition temperature, i.e., the temperature at which glass has melted sufficiently to have viscosity allowing it to reflow under surface tension) and thus minimize the distortion in the internal stress pattern. The sharp gradient is not critical for the annealed glass applications, however, it is essential for laminated safety glass as the laminate can be preserved only by minimizing the total amount of heat transferred to the glass (temperature at the glass-laminate interface). However, torches not fully meeting these ideal parameters can of course still have utility for practicing the present invention.

Under ambient temperature operation, the minimal dimension of the flames is approximately 3–5 mm for point Propane-Oxygen and Acetylene-Oxygen flames. With estimated flame temperature well above 2000° C., these flames produce hot spots (areas where temperature is sufficient for surface scratch removal) of approximately 5 mm in diameter in smallest dimension.

The nozzle design to produce a uniform linear heat source, which is preferably a substantially linear heat source, is very important for the success of scratch removal. In one advantageous embodiment of the invention, the nozzle generates a flame in the form of a thin slot, preferably a slot about 1 to about 10 mm in width, of burning fuel. In another advantageous embodiment of the invention, the nozzle generates a flame in the form of a thin slot, preferably a slot about 1 to about 10 mm in width, of burning premixed fuel mixture comprising oxygen. Following the study of glass materials, below are disclosed three nozzle designs that satisfy the heat source requirement. The slot of burning fuel should have length substantially greater than width—at least in the range of 5–10 cm for the 1–10 mm wide flames discussed in examples herein.

Exemplary Torch Design Embodiment 1: Solid, Linear Acetylene-Oxygen Torch

Figure 2:
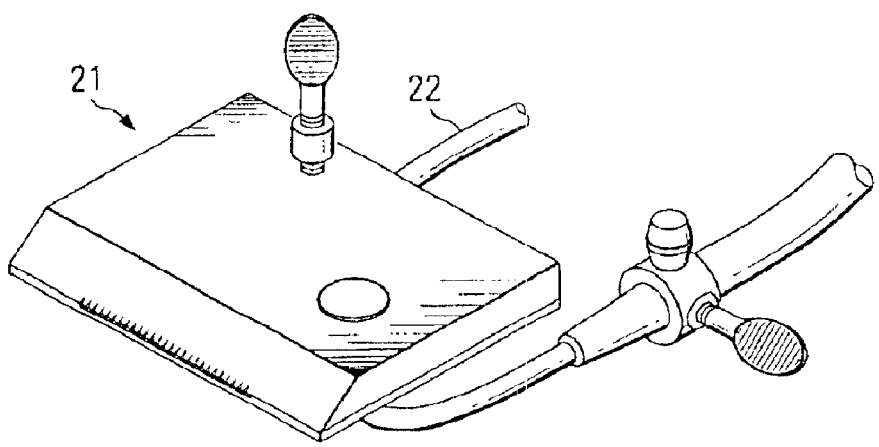
FIG. 2 depicts a solid linear acetylene-oxygen torch which produces a uniform and slim flame.

As shown in FIG. 2, this illustrative torch design consists of two aluminum plates with a liner between them shaped so as to produce a wide rectangular channel. The channel connects one of the edges of the assembly 21 with a redistribution chamber (not visible in the figure). The chamber is a rectangular void in the assembly of the same width as the channel that ensures equal pressure along the channel width (2.5 cm×2.5 cm—width by distance from the chamber to the outlet). A premixed acetylene-oxygen mixture is supplied to the redistribution chamber by means of inlet tube 22. The maximum width of the channel is on the order of 0.1 cm; for larger widths the flow velocity of acetylene-oxygen stream exceeds the critical value, at which the stream becomes turbulent and causes either flash back or extinguishment of the flame. At sufficiently low channel width, stable and essentially cylindrical flames (parallel to the outlet) of approximately 1 mm in diameter may be produced uniformly along the outlet.

Exemplary Torch Design Embodiment 2: Mixed Tube Array Torch

Figure 3:
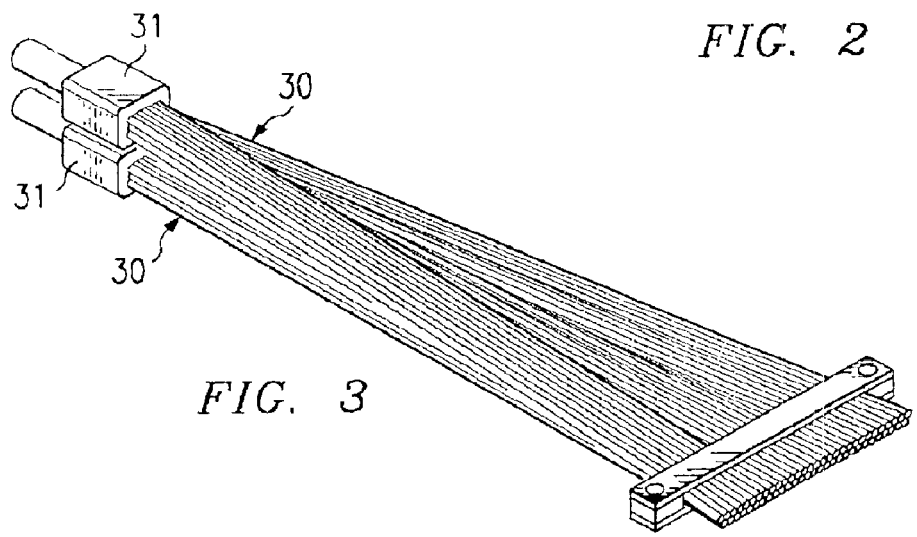
FIG. 3 depicts an exemplary construction of a mixed tube array torch.
Figure 4:
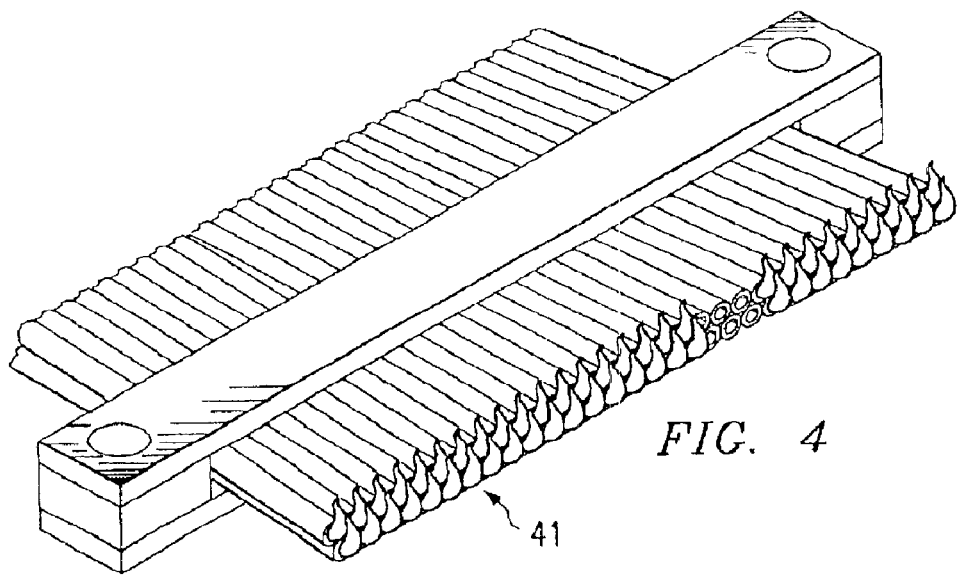
FIG. 4 depicts a uniform, stable linear flame with a temperature high enough for glass treatment, achieved via a mixed tube array torch.

As depicted in FIG. 3, two sets of thin metal tubes 30, preferably 0.9 mm–1.2 mm in diameter, are connected to fittings 31 for supply of fuel or oxygen at one end and welded together at the other. The result is a series of small burners spaced close enough to produce, as shown in FIG. 4, a in a one-dimensional, alternating array of ends of tubes carrying fuel and oxygen which can produce a linear flame 41. Mixing between the parallel, alternating stream of oxygen and fuel is sufficient to produce a flame having satisfactory temperatures for melting glass or other window materials. Because the velocity of oxygen can be controlled independently from the velocity of the fuel, velocity of the flames may be increased above the usual flame velocity $V_f$, thus decreasing the buoyancy effects (or tendency for the flame to rise upward) on the flame. The burner is safe since there are no enclosed volumes with the premixed gases. Satisfactory temperatures have been achieved with propane, which is cleaner, safer, and cheaper than some alternate fuels.

Figure 5:
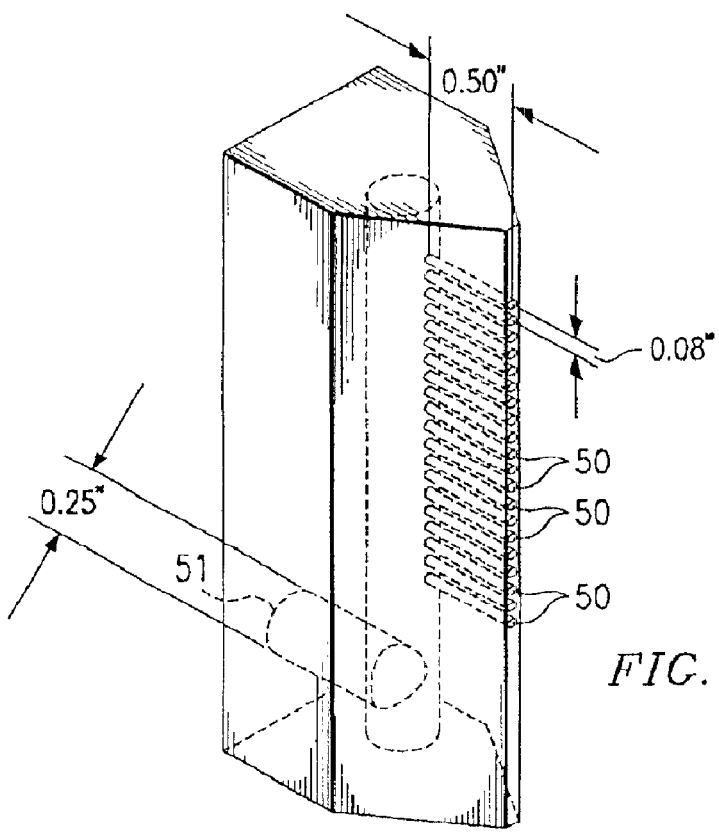
FIG. 5 depicts a linear multi-orifice premixed propane-oxygen nozzle.

Exemplary Torch Design Embodiment 3: Linear Multi-Orifice Premixed Propane-Oxygen Nozzle The nozzle, shown in FIG. 5, has a row of holes 50 spaced 0.08" apart linearly along a center line. These through holes have a diameter of 0.04" and are approximately 0.5" long. They are connected to the fuel supply (not shown) by a 0.25" hole 51 drilled perpendicular to the length of the holes and along the length of the row. The pre mixed propane and oxygen gases leave the tip through a small orifice and are ignited in the air, which create a flame of uniform temperature at a short distance about 0.3" from the end of the nozzle.

Figure 6:
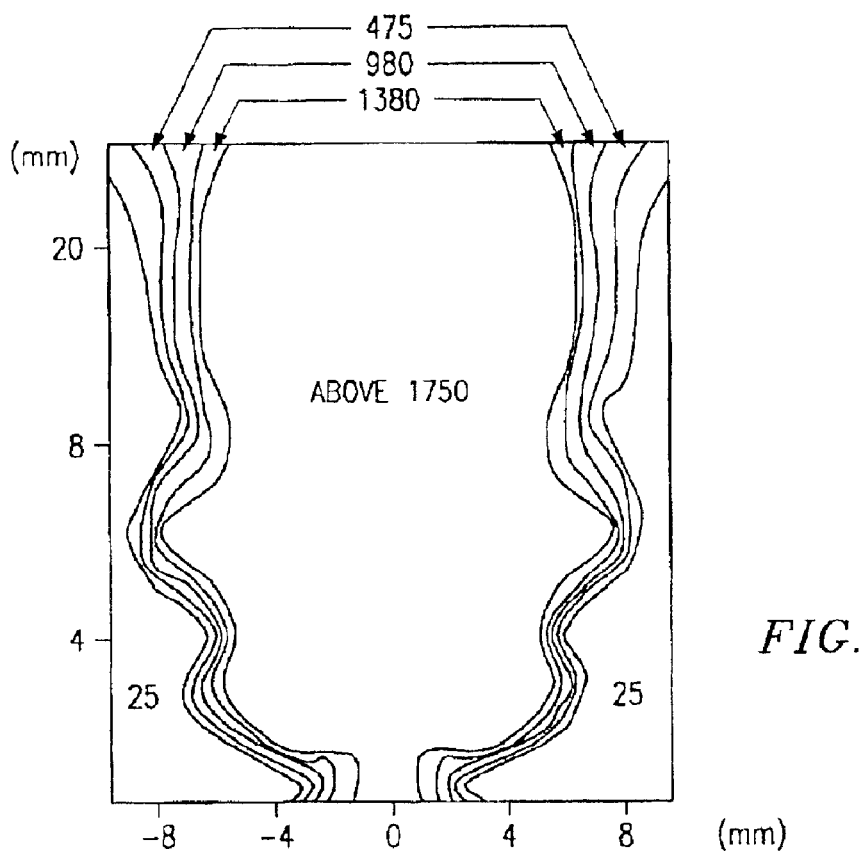
FIG. 6 depicts the measured temperature distribution in ° C. across the flame from linear multi-orifice nozzle.

The two-dimensional temperature profile of the flame cross section for this nozzle was studied experimentally under the volume flow rate of 6.0 liter/min for propane and 20.4 liter/min for oxygen (mixing ratio 1:3.4) at room temperature 25° C. The temperatures of the flame were measured using B-type high temperature thermocouple, which was mounted on a moving slide and scanned across the flame at 2 mm/sec. The procedure was repeated for different distances from the nozzle, at 2 mm increment up to 20 mm. From the tabulated data of measurements, the temperature profile of the flame is plotted in FIG. 6. Due to the limitation of the thermal couple, the highest temperature measured was 1750° C. The fuel (either propane or acetylene) and the oxygen are supplied from the gas tanks with the regulator output pressure set to 10 psi and 20 psi respectively. The fuel and oxygen are mixed in a commercial welding torch handle, Harris Torch-MEFS-098, which is mounted on the slide of the scratch removal apparatus. The range of fuel flow rate is approximately 1 to 8 (liter/min) and the range of the oxygen flow rate is 3 to 28 (liter/min). In most optimum combustion cases the ratio of fuel and oxygen is 3 to 3.5:1.

The Embodiment of the Mechanical Component

Figure 7:
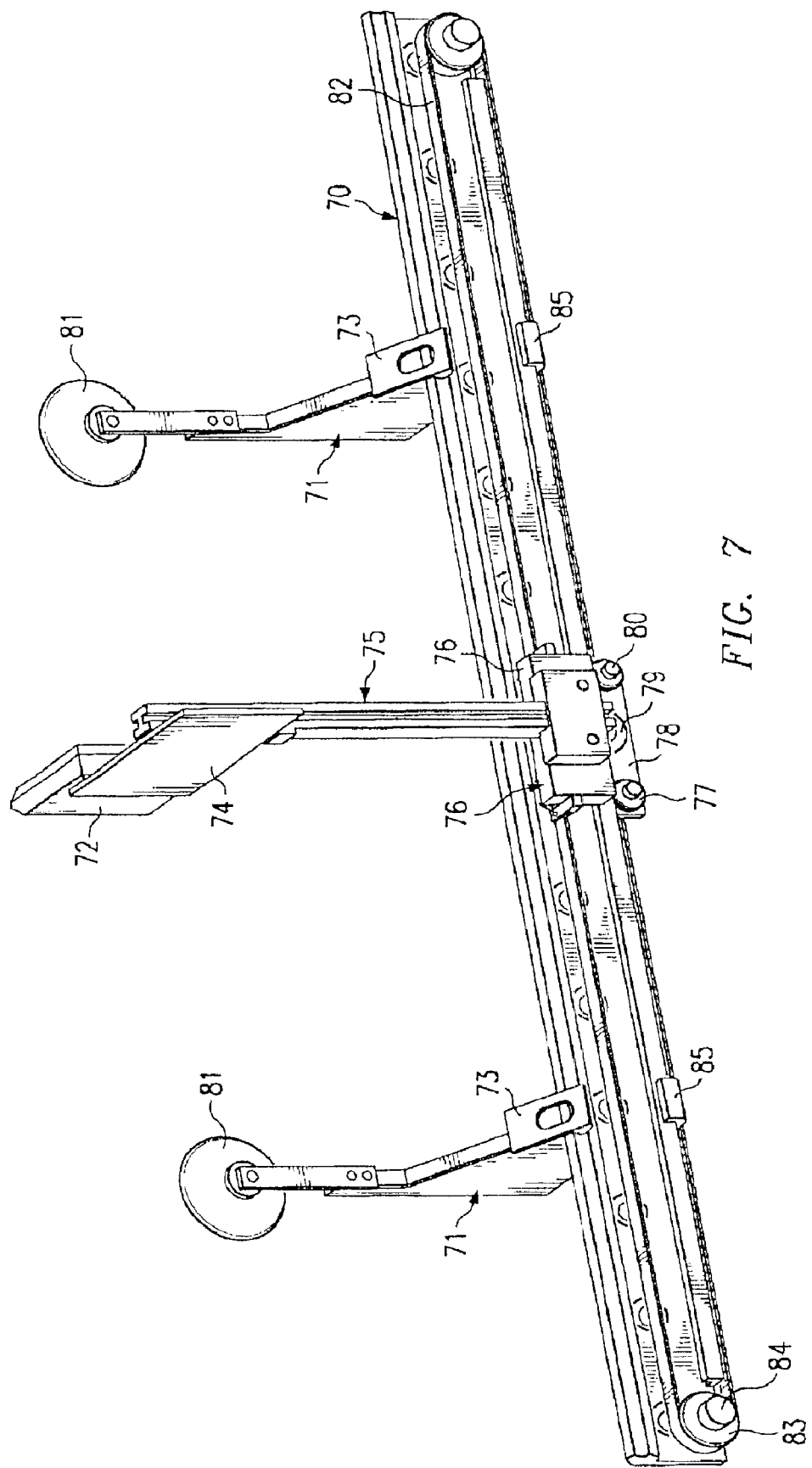
FIG. 7 illustrates an exemplary design of an apparatus to facilitate the use of the disclosed method and system.
Figure 8:
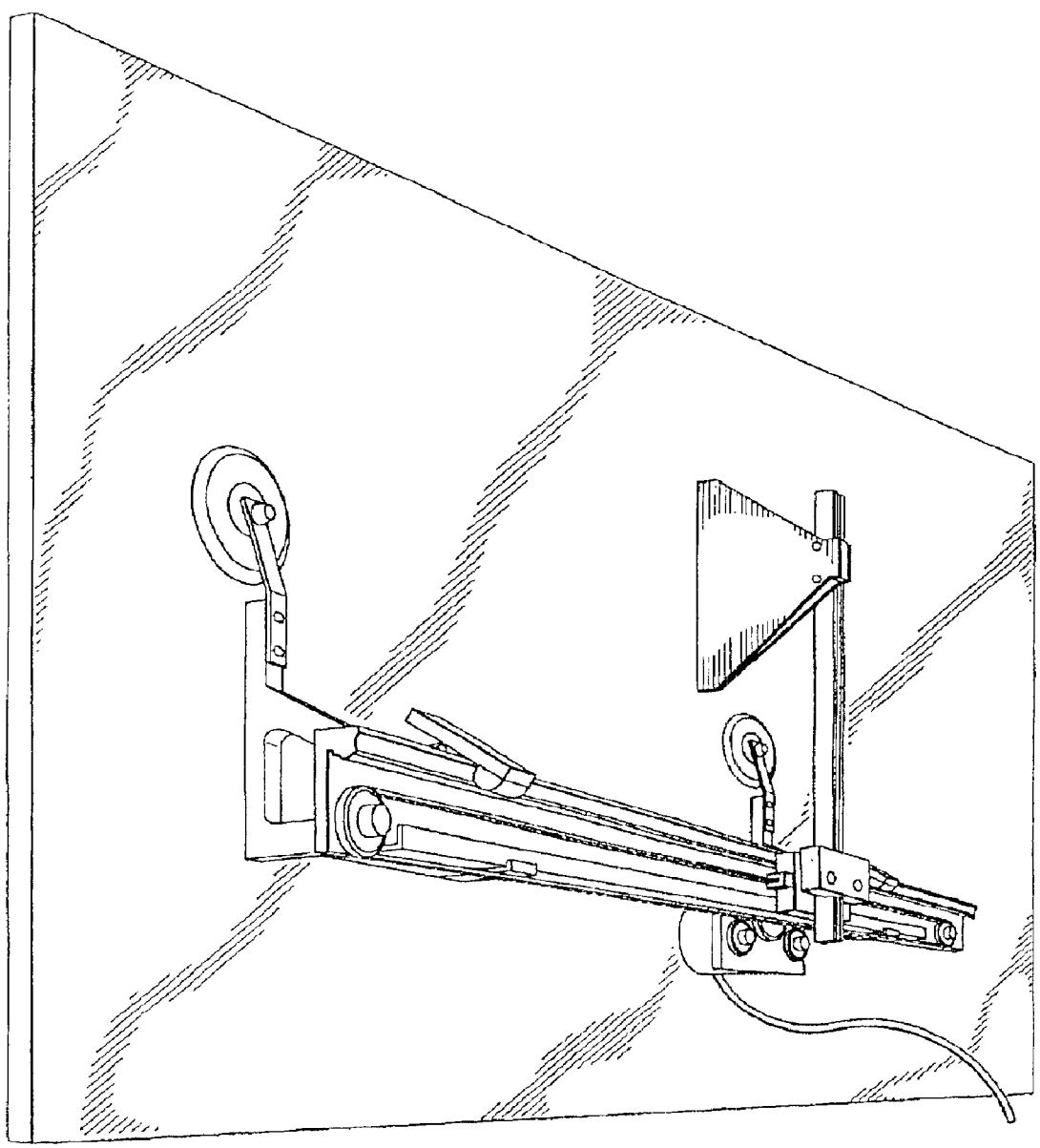
FIG. 8 illustrates an exemplary glass treatment apparatus as mounted on a glass panel.

Referring to FIG. 7 and FIG. 8 there is shown an illustrative embodiment of a simple but versatile machine for carrying out controlled surface scratch removal on a pane of glass or other window material. Because the temperature distribution, timing and speed of glass (or other window material) heating must ideally be delicately controlled, the torch is preferably not handled by a human operator. Instead, movement of the torch across a panel of glass or other window material is motor-driven, and its speed controlled electronically.

The machine illustrated in FIG. 7 is lightweight and portable, and can be positioned on the window panel vertically or horizontally. It weighs only 3.2 kg or 7 lbs. This machine can rest on the window sash or cling to the window pane using vacuum cups. Auxiliary support for this machine may be provided by an extendable leg similar to a tripod. Only movement of the torch along the X-axis is motorized in the figure, whereas translation of the torch and machine along the Y-axis is adjusted manually. More sophisticated automation, including flame monitoring, and automated motion control for Y- and Z-axes, can readily be provided with temperature sensors, additional motors, and controls.

The machine illustrated in FIG. 7 uses two reference brackets 71 to control the distance between the flame torch 72 and the glass surface (not shown). The flame torch 72 is mounted on a torch mounting plate 74 which is attached to a Y-axis element 75. Element 75 is mounted on motorized slide 76 which comprises plate gear 77, motor mounting plate 78, motor gear 79, and plate gear shafting 80. The reference brackets 71 can be moved and adjusted for different locations on the X-axis linear rail 70 to fit windows of different size and shape. The reference 71, brackets, which have a height of 5 inches, separate the rail 70 from the glass surface. This height is such that the flame torch 72 and the reference bracket 71 can be properly positioned with respect to glass panel while avoiding interference between the X-axis rail 70 and the window frame for almost all mass transit vehicles and buildings. The reference brackets 71 are designed such that they can slide freely along the external surfaces of the X-axis rail 70. They are locked into position by respective spring-loaded levers on the top rail grippers 73. Suction cups 81 attached to the reference brackets allow the machine to cling to a vertical window panel by vacuum force. The motorized slide 76 is driven by a positive drive belt 82, which is stretched by two end gears 83 on the shafts 84 mounted on the X-axis 70 rail. The flexible belt 82 in the drawing is preferably a twin core structure with molded polyurethane on stainless steel or kevlar cores.

In use, the operator uses both hands to grasp the two reference brackets 71 to hold the machine and to position it where surface scratch removal will be performed. When relocation of either one of the reference brackets 71 is necessary, the operator uses the hand holding the reference bracket 71 to be relocated to operate the spring loaded lever of the top rail gripper 73 for that reference bracket 71 to unlock the that top rail gripper 73 and slide that reference bracket 71 to a new location. By adjusting the spacing and location of the reference brackets 71, this machine can be adjusted to fit window panes of different sizes. The motorized slide 76, on which the Y-axis element 75 and the flame torch 72 are mounted, can move between the two reference brackets 71 or beyond the brackets. The X-axis linear rail 70 of the present embodiment is thirty-eight inches long, which covers a majority of the window sizes typically found in mass transit vehicles and residential houses. For extra-large windows, or large glass walls such as those used in buildings or glass bus shelters, this machine can be repositioned to repair the pane in separate sections.

The motion of the slide is controlled by a small stepping motor with a wide speed range. The slower speed is used for the actual controlled surface scratch removal process of the present invention, while a high speed setting with reciprocating motion allows the flame to pre-warm the glass panel for stress relief as well as for heat treatment after the scratch removal process. The motion control and the flame torch temperature control are computerized to suit different applications. For tempered glass that has a tendency to crack, the high-speed flame torch motion can pre-heat and warm up the glass pane so that it reaches the glass transition temperature uniformly. This process resolves the cracking issues normally encountered in treating tempered glass due to excessive thermal stress.

The present invention addresses various technical problems in applying this new approach to removing scratches from panes of glass or other window materials.

Sagging

When the glass pane is positioned horizontally, the desired smoothness and evenness of the glass surface after scratch removal in accordance with the present invention is easily achieved. However, this invention can also be applied to repair the window panel at the site without removing the panel from its frame. When window panels are in a vertical position, as in rail car or building doors and windows, the force of gravity can cause the molten or softened glass to sag. Therefore, the melting/smoothing process must be well controlled so that the melted surface layer is not any deeper than the scratches. In this manner surface tension will prevent the thin melted layer from sagging even when the window pane is in a vertical position. This holds true for essentially all instances where the depths of the scratches, and therefore the depth of the melted surface layer, is small compared to the thickness of the window pane being repaired.

Safety Glass

Figure 9:
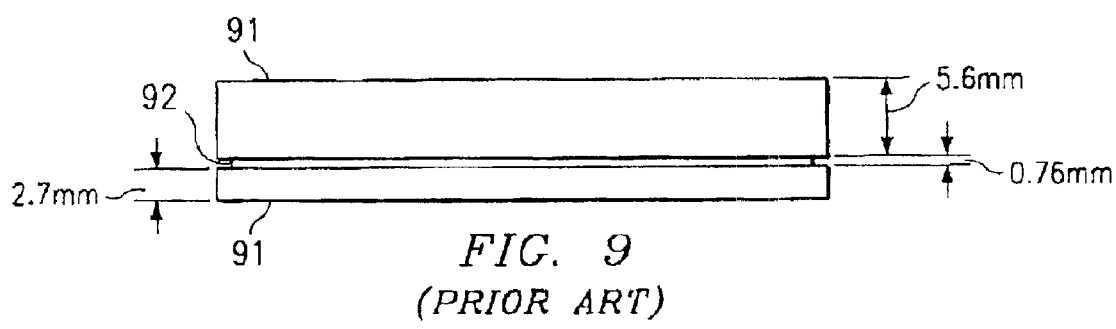
FIG. 9 illustrates the construction of exemplary safety glass of the prior art.

Referring to FIG. 9, window panes of, e.g., automotive safety glass are generally made with two plates 91 of thermally and chemically tempered soda-lime glass (ordinary window glass) held together by a plasticized polyvinyl butyral (PVB) resin film 92. Autoclaving the glass-PVB "sandwich" at approximately 110° C. and 15 atm usually achieves an extremely good adhesion. PVB is a very stable substance at room temperature; however, it pyrolyzes at temperatures close to 300° C., as is indicated by the pyrogravimetric curve of PVB in air, which shows a sudden increase in decomposition rate of PVB around this temperature. For purposes of the present invention, the critical temperature at which the PVB layer pyrolyzes may be regarded as slightly higher because PVB will be subjected to pyrolyzation temperatures only for short time intervals and because the system is of constant volume (for the area away from pane edges). Therefore gases produced at initial stages of decomposition of the PVB layer may be expected to dramatically increase the pressure on PVB and shift the decomposition equilibrium to the side of decomposing material. Because the encapsulation of the PVB layer is also air-tight, oxidation and burning of the PVB layer. In summary, melting of a thin surface layer of a tempered glass pane for scratch removal should be controlled such that the temperature of the PVB layer is kept below a certain critical level at which the PVB layer decomposes.

Figure 10:
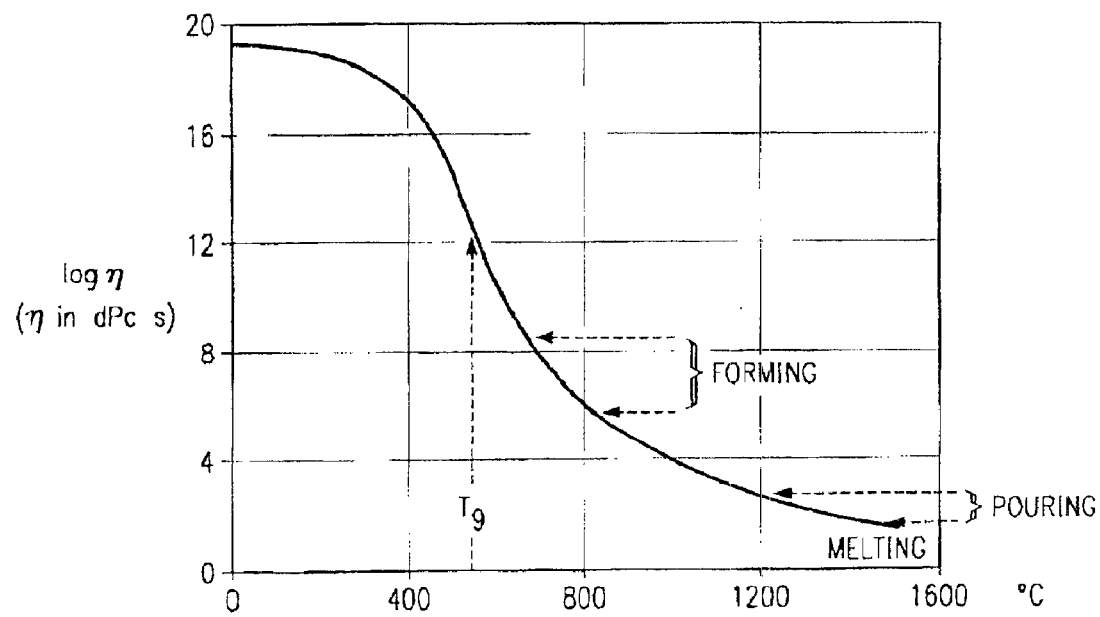
FIG. 10 illustrates the substantial decrease in viscosity of the glass at the glass transition temperature.

Although specific details on the composition, properties, and manufacturing process of the safety glass plates used for the window panes manufactured by third parties are generally proprietary, information on the basic properties of the sandwiching of glass plates is available. Glass used for the sandwiching plates of safety and for practically all windows is ordinary soda-lime glass. The compositions of commercial soda lime glass by approximate weight are $SiO_2$, 72.6%, $Na_2O$, 15.2%, CaO 4.6%, MgO, 3.6%, $Al_2O_3$, 1.7% and $B_2O_3$, 0.8%. Temperature dependence of viscosity of this glass is illustrated in FIG. 10. Since glass is very nearly a Newtonian fluid, the minimum temperature and the duration of heating necessary to melt a surface layer of sufficient depth and low viscosity for surface tension to smooth out the scratches in the glass surface is readily determined. These parameters will be highly dependent on the widths and depth of the scratches.

Crack Avoidance for Tempered Glass

The types of glass used on transportation vehicles are typically tempered, which affects their properties dramatically. The purpose of tempering is to subject the surface of the glass panel to compressive stress. Since breakage is generally caused by an expansion of microscopic surface defects due to tensile stresses, breakage can be prevented if the applied tensile stresses are balanced by the permanent compressive stress of the surface. Tempering involves uniform rapid cooling of a glass object from temperatures above its glass transformation temperature, $T_g$. $T_g$ is defined as the temperature at which $\eta=10^{13}$ poise, where $\eta$ is the viscosity of the glass. It characterizes a temperature range within which glass transforms from melting with viscosity sufficiently low for any internal stress relaxation to occur in a relatively short time (i.e. glass behaves like a viscous liquid on the time scale of the scratch removal treatment) to relaxation times being sufficiently long for residual stresses to remain. Chemical tempering produces a similar effect by alkali ion exchange. A glass product is dipped into a melt of potassium nitrate ($KNO_3$), where $Na^+$ ions at the glass surface are replaced by much larger $K^+$ ions. Larger space requirements for $K^+$ ions result in larger surface stress. Exchange depths usually reach 10–100 $\mu$m. Thus, tempering produce surface compressions up to 1000 $MN/m^2$. High compressive stresses are kept relatively close to the surface, and the tensile stresses inside the glass are several times smaller in magnitude. However, this causes a major problem in the application of controlled surface scratch removal, i.e., cracking of glass due to thermal expansion.

Based upon an experimental study, there are two types of cracks that form by different mechanisms. The first type, body cracks, generally form in the plane normal to the surface of glass and extend from one surface to the other surface of the glass pane. These cracks probably result from thermal expansion of the glass surface, thereby increasing the tensile stress of the internal regions past the breaking point. Body cracks are always produced during the initial stages of heating. Low temperature flames and larger flame dimensions are more inclined to cause body cracks than high temperature narrow flames. Hence, the problem of body cracks can be solved by reducing the heated area, thereby reducing the total thermal stress in the pane. The second type of cracks, surface chips, may form when a small, rapidly heated area begins to cool, and the adjacent material is heated by thermal conduction. While the center of heated area contracts, the underlying regions expand producing high tensile stresses on the boundaries of the volume initially heated. Such cracks are characteristic of very hot heating flames, rapid heating and cooling rates, and small heating areas, which, result in local temperature gradients. Note that the cracking phenomena are of concern only when no substantial portion of glass is above its $T_g$. Above $T_g$ the modulus of elasticity of glass drops practically to zero, as shown in FIG. 10. Therefore, all local stresses can be relieved by a sufficiently large mass of the glass plate having a temperature above $T_g$. The glass cracking problem described above can be largely resolved by compliance with the following constraints 1. The viscosity of a sufficient volume of glass around a crevice must be low enough for surface tension to maximally fill the scratch or etch crevice.
2. The temperature of the remaining surface of the glass plate should generally not exceed a certain critical value for more than a specified period of time.
3. Thermal stresses due to temperature gradients must not exceed a critical value. This implies that a certain maximum value of the temperature gradient cannot profitably be exceeded.

Heat Source Requirements

The general requirements for the optimal heat source herein are as follows:

1. The heat source must be of maximal attainable temperature, at least well above one-thousand degrees Celsius (1000° C.). High temperatures will produce high surface heating rates, therefore increasing the temperature gradient normal to the surface, which will allow PVB laminate to be preserved while melting the surface layers of glass. In general, the temperature should be above $T_g$ for a surface layer depth only slightly below the scratch depth (~50 µm total depth). This requirement may be satisfied by many oxygen-fuel gas mixtures, as shown in Table 1 below:

TABLE 1

Temperatures reached by various fuel and oxygen level mixtures, and fuel and air mixtures

| | Temperature (° C.) | | | |
|---|---|---|---|---|
| | $O_2$ | | Air | |
| Fuel Gas | Actual | Calculated | Actual | Calculated |
| Acetylene | 3100 | 2600 | 2325 | 1879 |
| Propane | 2815 | 1876 | 1900 | 1436 |
| Methane | 2770 | | | |
| Hydrogen | 2825 | | | |
| Propylene | 2930 | 2035 | | 1535 |

2. The heat source must have at least one dimension in the plane of the glass that is extremely small. Heating only a small total area appears to be the only way to reduce overall thermal stress in a glass plate below its critical value (i.e., the value at which cracks occur). Accordingly, in one exemplary embodiment of the invention, the linear heat source applies heat to a long and narrow band of the window material at any given time during the controlled surface scratch removal process. Preferably, the band has a width which is about equal to the width of the flame, and a length which is less than or equal to the longest dimension of the scratched window surface.

Heat Source and Temperature Distribution

Both analytical and numerical methods have been used, to calculate heat transfer and temperature distribution.

Figure 11:
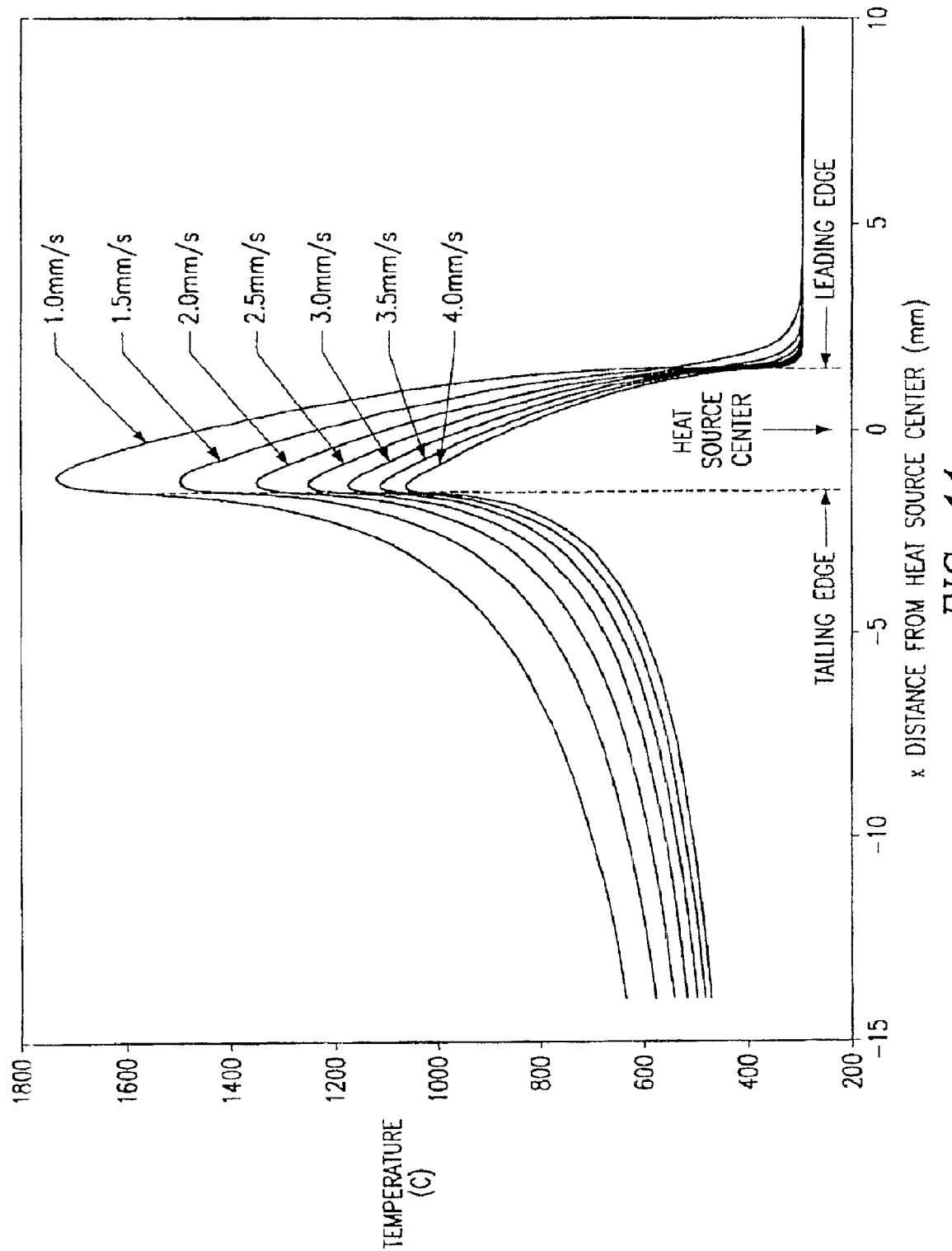
FIG. 11 illustrates the surface temperature distribution along the direction of heat source motion (left to right) for source speeds varying from 1 mm/s to 4 mm/s.

The thermal effects on glass due to an impinging flame are analyzed using a heat transfer mathematical model. The heat transfer to the glass due to a flame depends upon many parameters such as velocity of expelled burning fuel, composition of the burning flame, and flame geometry, among others. Precise analysis of the temperature fields and fluid flow in the combustion flame is extremely difficult. Instead, an analysis of the forced convection heat transfer due to the impinging jet flow is assumed to suffice in the vicinity of the glass, where the thermo-flow field controls the heat transfer from combustion flame to glass panel. To simplify computational analysis, an impinging jet flow is substituted for a combustion flame, because of the difficulty in analyzing the thermo-flow field both inside and outside the flame. The input heat fluxes used for the simulations are estimated from existing heat flux data under similar condition since heat flux measurement is a complex task. The temperature distribution on a glass pane is influenced by parameters such as thermal conductivities, thermal diffusivity, specific heat, density, and emissivity of the glass pane. The analysis of temperature distribution of a glass pane is related to known theoretical approaches. This requires that the computational results be dimensionless parameters so that comparison with existing analytical results can be made. FIG. 11 shows the result of analysis, indicating the temperature response profile for various travel speed of the torch.

Figure 12:
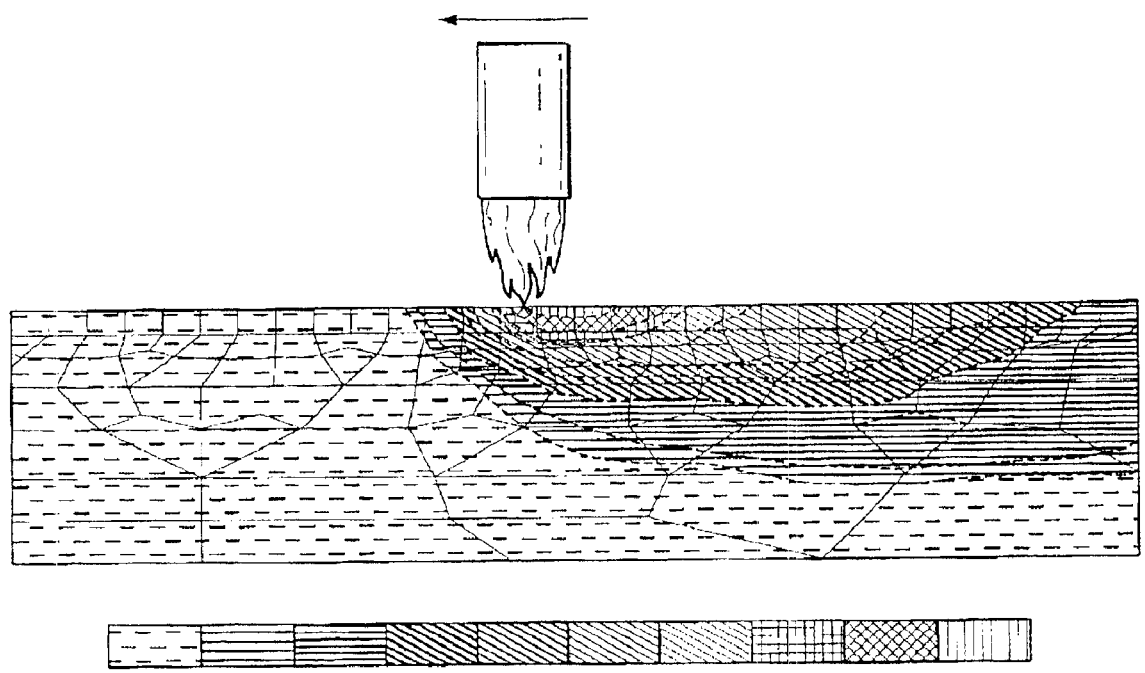
FIG. 12 illustrates a computer simulation showing an ideal temperature distribution for controlled surface scratch removal.

Analysis of the temperature distribution reveals the interaction between the heat source and the glass. The results of the analysis demonstrate that the temperature may be controlled to have a desirable distribution. FIG. 12 illustrates a computer simulation showing that it is possible to obtain an ideal temperature distribution for controlled surface scratch removal. In this case, a 1700° Celsius, flame of 3 mm wide travelling at 0.001 m/s with a heat flux of 1.2 W/mm² can melt a surface layer of a glass pane while the glass body still remains below three-hundred degrees Celsius (300° C.). The glass thickness in this figure is 9 mm, the standard thickness of subway rail car glass.

To avoid cracks, the internal stress within the glass panel must be controlled to be within the material strength. The internal stress of the glass is influenced by the temperature gradient and temperature distribution due to the thermal expansion effect. The material's ability to resist cracking is also a function of temperature. Computational stress distribution can be obtained from the temperature distribution by finite element or finite difference method. To better understand the stress distribution within the glass, and to develop a strategy for crack avoidance, various heat source arrangements, flame scanning speeds, and pre-annealing, pre-warming or cooling arrangements can yield the internal stress distribution within the glass cracking strength. Combined considerations of temperature and stress distributions provide the optimum solution for controlled surface scratch removal in accordance with the present invention.

Control Parameters for Scratch Removal

For a flame torch nozzle, the heat flux is controlled by the flow rate and mixing ratio of propane and oxygen. A specific local area of the glass is subjected to the heat flux for a period of time. The exposure time is a function of the flame thickness and its travel speed. To establish the operation region for successful controlled surface scratch removal, a series of experiments were conducted. There are four main working parameters: (1) the flow rate of fuel gas, (2) the flow rate of oxygen, (3) The moving speed of heat source, (4) the working distance between the glass surface and torch with specified tilted angle.

Figure 13:
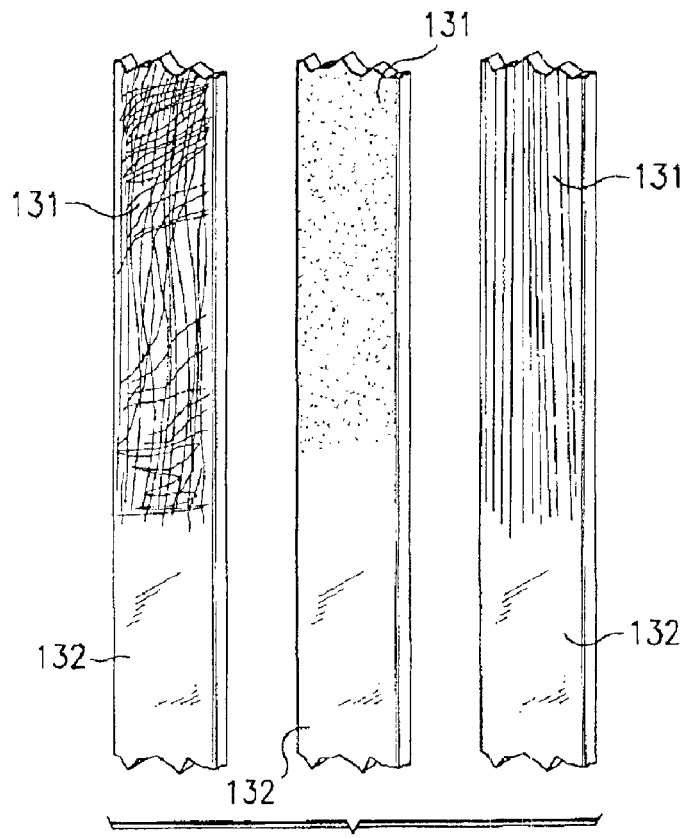
FIG. 13 depicts scratched and frosted glass samples, and illustrates the efficacy of the controlled surface scratch removal process in removing the scratches and frost on the lower portions of each sample.

In one set of experiments to evaluate controlled scratch removal in accordance with the present invention, specimens of soda lime glass of ⅛ and ¼ inches thick were scratched heavily on one surface. A flame of propane-oxygen mixture with the temperature more than one-thousand-six-hundred degrees Celsius (1600° C.) was applied with a slow motion of two (2) inches per minutes to the scratched specimen, and the scratches 131 on the upper portions largely disappeared as depicted in the lower portions 132 in FIG. 13. The sample exhibits no major distortion when the process is well controlled. The process produces useful results whether the specimen is horizontal or vertical. The process was also applied to a frosted glass specimen where the specimen became transparent.

In another set of experiments, regular soda-lime glass panels were cut into specimens of ¼ inch thick, one inch wide and 4.5–6 inches long. The width of the glass was so selected that it was covered fully by the full length of the flame to avoid the flame edge effect. The glass samples were held vertically, and the nozzle of the torch was also vertically oriented. The linear flame had the tendency of having a higher temperature on top due to the convection effect. To compensate for this, the glass was tilted by a small angle of approximately 5° away from the top of the torch nozzle. The distance between the center of the glass and the nozzle was then measured.

FIGS. 14–18 summarize graphically the experimental results obtained using different propane flow rates, propane-oxygen mixing ratios, torch nozzle to glass sample separation, which represent the sample heating rate, and nozzle moving speed, which represents the heat exposure of the sample time. After undergoing the controlled surface scratch removal process, the glass samples were examined for quality of the treatment, and were classified into one of the three categories below. Specifically, FIGS. 14–18 show regions which were well-polished, or optimally treated, whereby scratches are removed without either distortion or cracking of the glass; under-treated, which meant that the temperature or the duration of the treatment were insufficient, whereby the glass sample suffered from cracking upon heating, had reduced optical transparency and clarity, and/or had incomplete scratch removal; or over-treated, which meant that the temperature or the duration of the treatment were too high, which meant that bubbles appeared on the glass surface, the glass was severely burnt, or cracking occurred upon cooling. The experimental results shown graphically in FIGS. 14–18 indicated that a specific region of operating parameters exists for optimal treatment. In order to get optimum treatment results a range of operating parameters of the flow rate of propane and oxygen, the moving speed of torch, and the working distance between the glass surface and torch nozzle must be used.

The experimental results shown graphically in FIGS. 14–18 indicated that the flow rate of gas and oxygen is close to being a linear relation for only specified region of operating parameters: higher flow rate of gas and oxygen which produce higher heat flux intensity requires a higher speed of torch movement for best treatment quality. The sample glass panel was tilted at an angle of about 5° away from the top of the torch nozzle and several working distances between 0.7 and 2.7 cm between glass surface and torch nozzle were used. These settings are most appropriate for obtaining optimal treatment results.

Figure 19:
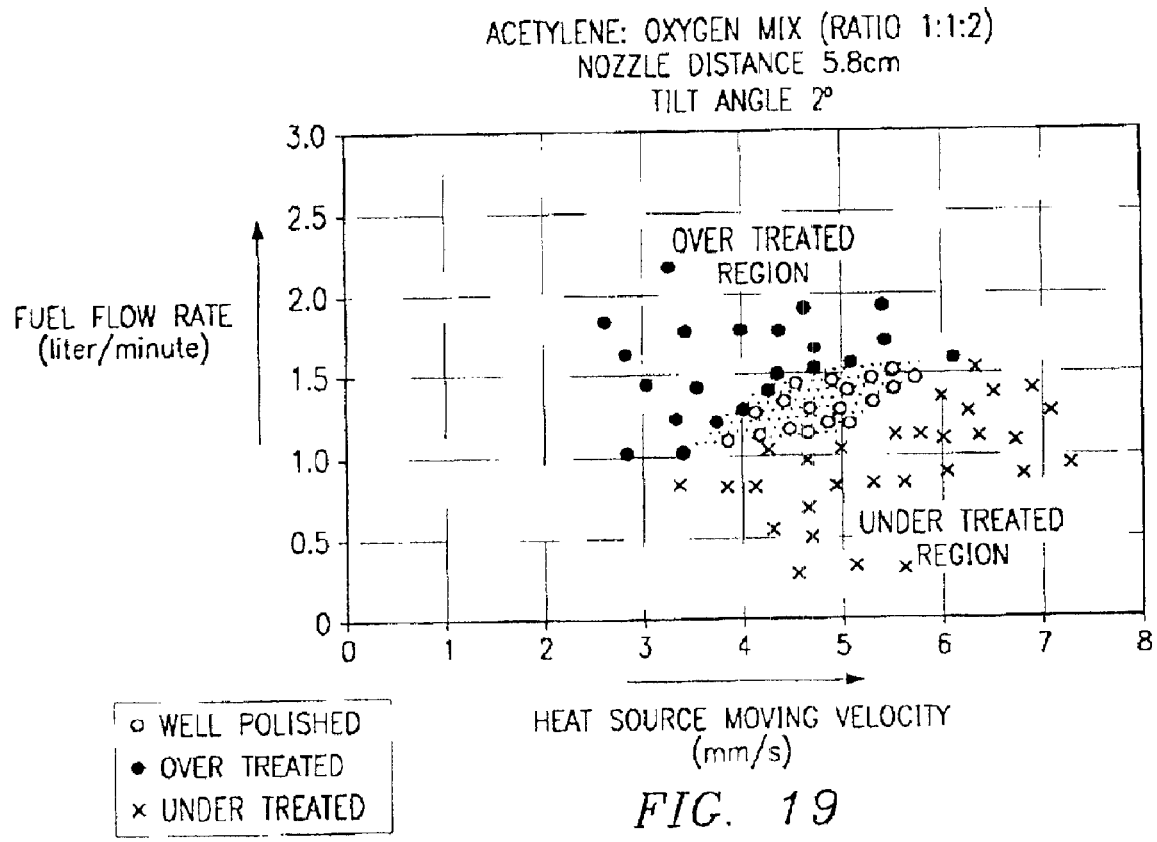
FIG. 19 is a graphical plot of the quality of glass surface scratch removal treatment as a function of fuel flow rate and heat source moving speed with an acetylene:oxygen mixing ratio of 1:1.2, a nozzle distance of 5.8 cm, and a tilt angle of 2°.
Figure 20:
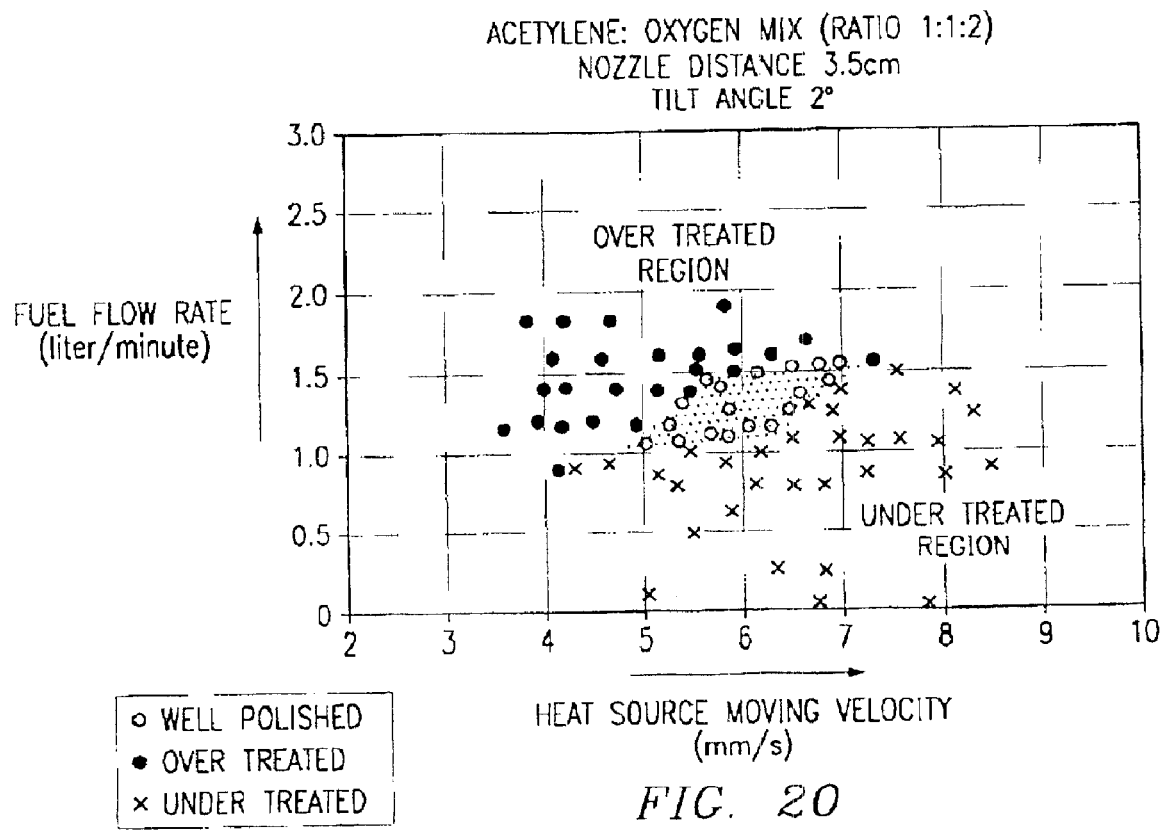
FIG. 20 is a graphical plot of the quality of glass surface scratch removal treatment as a function of fuel flow rate and heat source moving speed with an acetylene:oxygen mixing ratio of 1:1.2, a nozzle distance of 3.5 cm, and a tilt angle of 2°.

Using acetylene instead of propane, the torch movement speed can be much faster, by approximately 6 times that of when propane was used. This is due to higher flame temperature produced by the reaction of acetylene and oxygen. FIGS. 19 and 20 summarize graphically the experimental results obtained using different acetylene flow rates, acteylene-oxygen mixing ratios, torch nozzle to glass sample separation, nozzle moving speed, and sample tilt for scratchitti removal from the surface of a glass panel sample. Although acetylene can accelerate the controlled surface scratch removal process, control of the flame is more difficult, and the operator must deal with the generation of soot and allow the selection of parameter settings for obtaining optimal treatment results.

Figure 14:
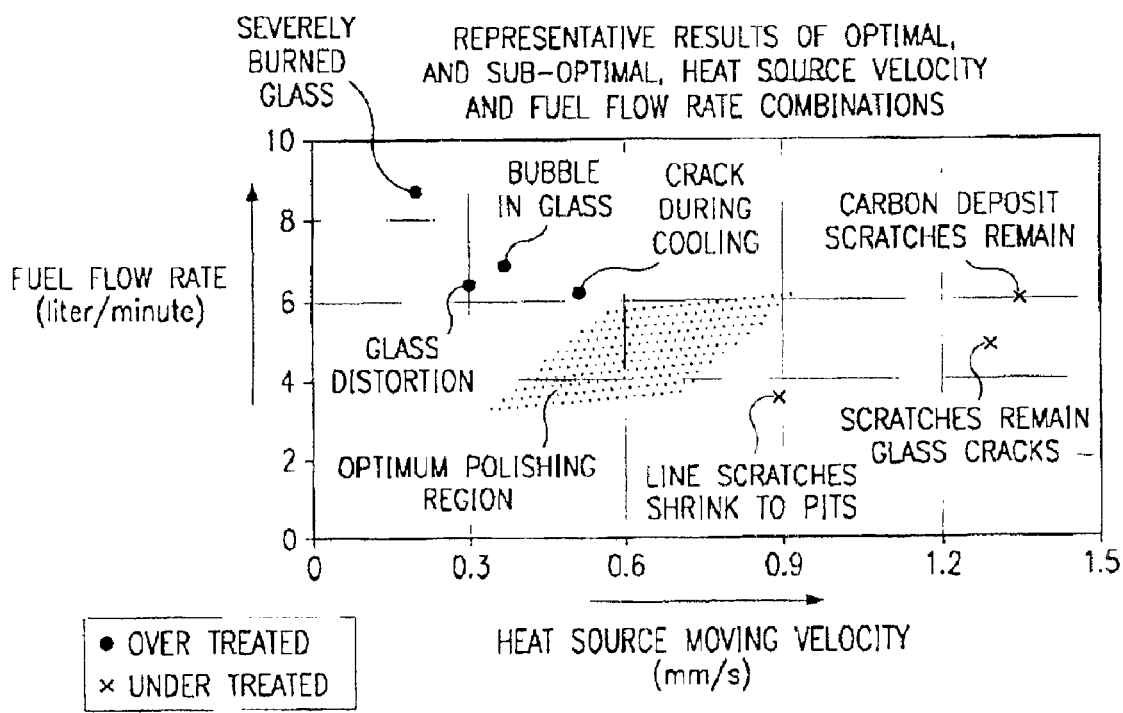
FIG. 14 is a representative graphical plot of the quality of glass treatment as a function of fuel flow rate and heat source moving speed for the generalized case of propane oxygen fuel mixes, as derived from experimental findings testing scratch removal performance in various nozzle arrangements.
Figure 15:
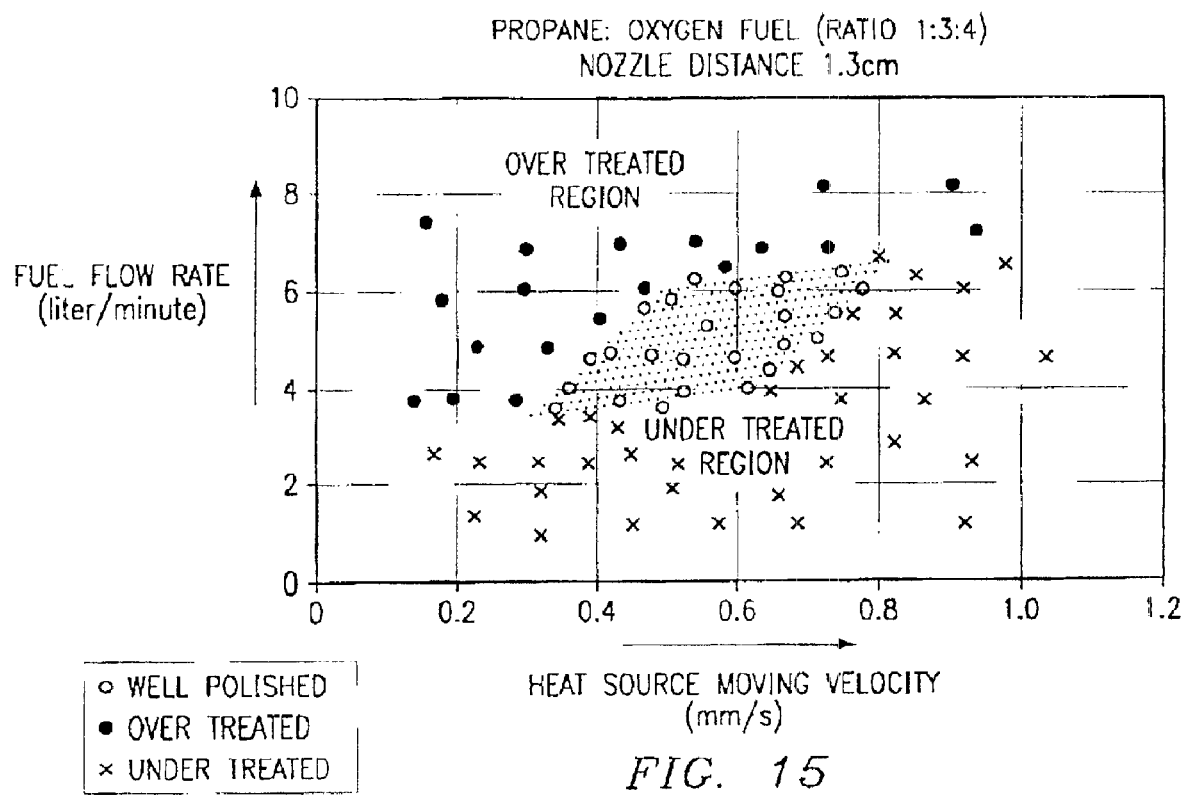
FIG. 15 is a graphical plot of the quality of glass surface scratch removal treatment as a function of fuel flow rate and heat source moving speed with a propane: oxygen mixing ratio of 1:3.4 and a nozzle distance of 1.3 cm.
Figure 16:
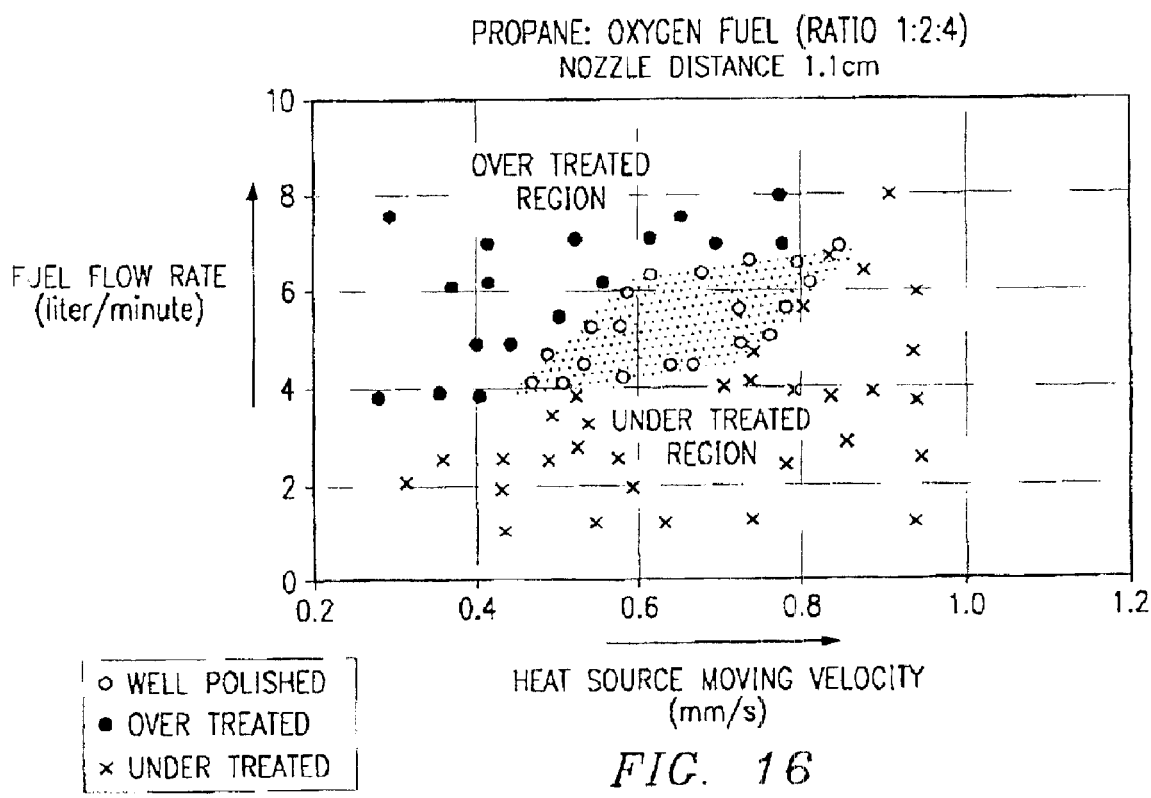
FIG. 16 is a graphical plot of the quality of glass surface scratch removal treatment as a function of fuel flow rate and heat source moving speed with a propane: oxygen mixing ratio of 1:2.4 and a nozzle distance of 1.1 cm.
Figure 17:
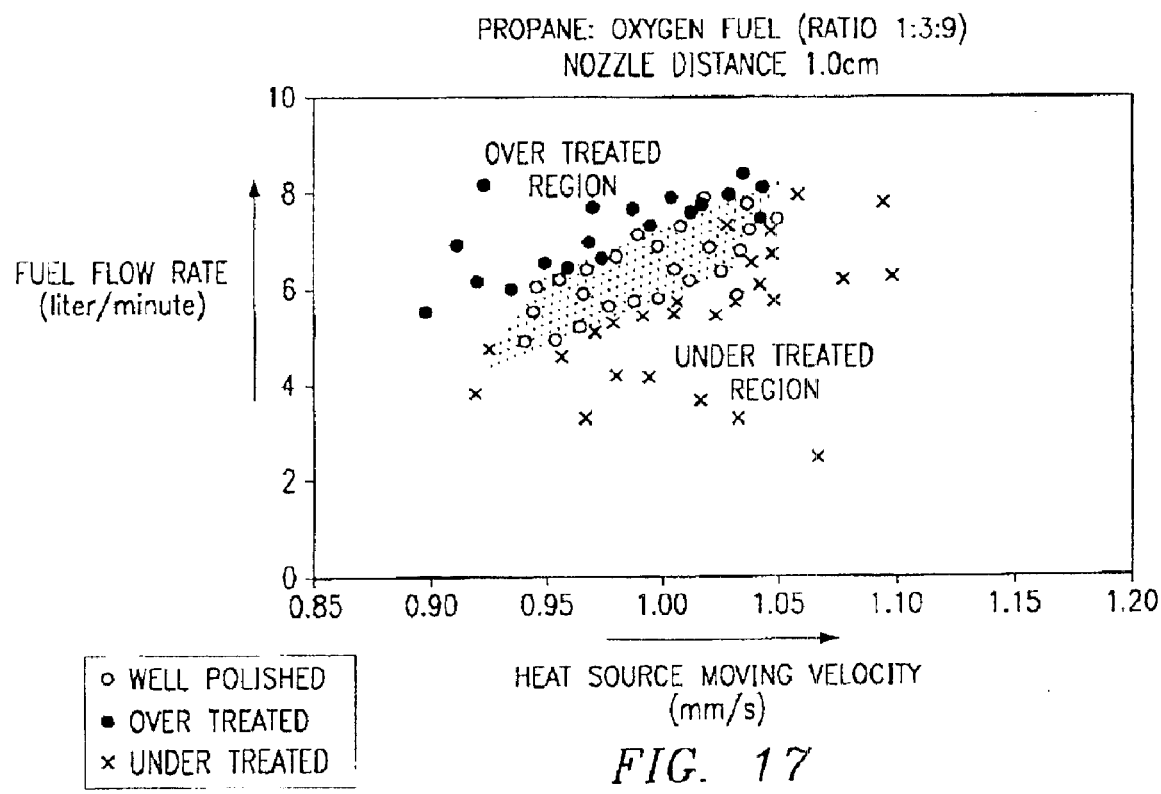
FIG. 17 is a graphical plot of the quality of glass surface scratch removal treatment as a function of fuel flow rate and heat source moving speed with a propane: oxygen mixing ratio of 1:3.9 and a nozzle distance of 1.0 cm.
Figure 18:
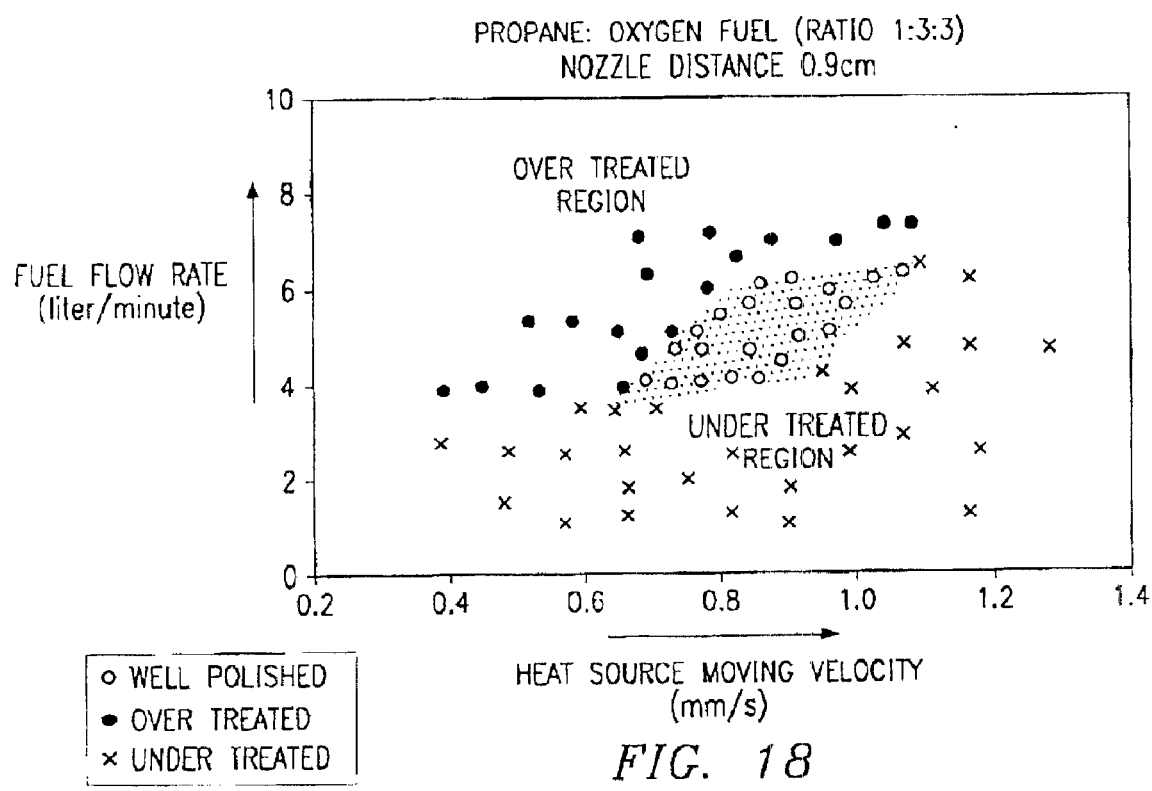
FIG. 18 is a graphical plot of the quality of glass surface scratch removal treatment as a function of fuel flow rate and heat source moving speed with a propane: oxygen mixing ratio of 1:3.3 and a nozzle distance of 0.9 cm.

Excessive heat treatment of the glass surface results in an unacceptable quality of treatment referred to as "over treated" in FIGS. 14–20. Excessive heat treatment can be caused by factors such as excess flow rate of fuel and oxygen, and/or movement speed up the torch nozzle being too slow. On the other hand, insufficient heat treatment of the glass surface also results in unacceptable quality of treatment referred to in FIGS. 14–20 as "under treated". Insufficient heat treatment can be caused by factors such as the flow rates of fuel and oxygen being too low and/or the movement of the torch nozzle being too fast. FIG. 14 summarizes graphically experimental results where the processing parameters used for the controlled scratch removal process have resulted in samples that were either under treated or over treated, and the associated defects in the treated samples.

The controlled surface scratch removal process is achieved only if the surface free energy becomes larger than the energy of molecular level reorganization; however, less than the required energy transferred to the solid window panel results in an undertreated panel because when the temperature of the surface layer of the panel is too low, there is not enough surface tension to even out the scratched surface. The boundary of interface between liquid state and solid state is too broad rather than a steady formation.

An increase in distance between the torch nozzle and the glass surface has a negative effect on the quality of the controlled surface scratch removal process; an increase in distance results in an increase of fuel consumption in order to produce same heating effect as if it were closer. In general, the surface quality of the glass pane after it has been processed can be more controllable if the distance is decreased. This is because an increase in distance results in a turbulence effect caused by heat convection of ambient air and the irregular heat flux of the flame. However, if the distance between the glass pane and torch nozzle is too close the glass panel surface will not be at the highest temperature region of flame and incomplete combustion may occur, which reduces the quality of glass surface scratch removal treatment. Therefore, operating parameters should be chosen with the optimum distance between the glass panel surface and torch nozzle, which is approximately in the range of 1.3 to 1.6 cm. Operating parameters for well-polished glass panels, such as the flow rate of fuel and oxygen and traveling speed of heat source, depend on the distance between the glass panel surface nozzle and torch nozzle as well as the particular fuel mixture ratio, as indicated in FIGS. 14–20.

Optimal operating parameters to be controlled include the flow rate of fuel and oxygen and ratio of the oxygen and fuel, because the flame temperature is determined by the flow rate and ratio of oxygen and fuel. In the experiments described above the ratio of oxygen to propane is in the range of 2.7 to 3.5, however, a ratio of approximately 3.4 provides best burning conditions from the standpoint of achieving clean combustion and reduce soot, which are essential to optimum controlled surface scratch removal. If a smaller mixing ratio is used incomplete combustion may occur, which produces soot. If a larger mixing ratio is used the flame may be blown off, because the velocity of the fuel-oxygen mixture is higher than burning velocity.

A major problem with the controlled surface scratch removal process of the present invention is cracking of the glass panel during treatment. Cracking occurs most often when the glass panel being cooled after heating. When a glass panel surface is heated by heat flux injection, the initial stress developed is compressive so that the probability of cracking is relatively small. However, when the glass panel is suddenly cooled, the stresses created are tensile so that the probability of cracking is greatly increased. The thermal stress on a glass panel surface in steady state can be expressed as follows, $$\sigma_r = \frac{E\alpha(t-t')}{2(1-\mu)}$$

In steady state the thermal stress is proportional to the temperature differential (t–t) and the coefficient of expansion of the glass but is independent of the thickness of the glass panel. The surface stress could be about 10 kpi in case of a temperature difference of 1000° C. in glass according to equation (1). However, equation (1) can only be treated as an approximation. The strength of soda-lime glass is approximately 9 to 14 kpi. Therefore, cracking may occur when the temperature changes between 0 to 600° C.

To obtain a good surface scratch removal, smooth thermal transition is very important. Because rapid cooling can cause severe thermal stress distribution in glass, to slow down the cooling rate; a backing glass pane positioned behind and in contact with the glass surface being treated can contain heat energy for a certain period during the controlled surface scratch removal operations. Currently, there is some limitation regarding size of the treated glass pane. If the dimensions of the glass panel are larger than the length of the torch nozzle, the glass is heated partially rather than uniformly. Advantageously, the torch nozzle is designed with the end section of the nozzle progressively changing the heat intensity to prevent high temperature gradients and thermal stresses near the ends of the nozzle that can cause cracks to occur. Another approach is to make the torch nozzle longer so as to extend across the entire width of the only reduce the probability of causing cracks in the glass panel, but will also increase the efficiency of the controlled scratch removal process.

While the present invention has been described hereinabove in connection with certain useful embodiments or implementations, it will be understood by those of ordinary skill in the art that these embodiments are exemplary and illustrative only and do not limit or define the present invention. Other useful variations and modifications of the present invention could readily be made by, and would suggest themselves to, those of ordinary skill in the art without departing from the present invention, and the examples given hereinabove do not constrain spirit and scope of the present invention, which are limited only by the claims set forth below.

I claim:

1. A method for removing scratches from a planar panel of a translucent or transparent material, comprising the step of controllably heating with a substantially linear heat source to produce a relatively thin, substantially linear flame;

wherein said relatively thin, substantially linear flame is progressively applied across a band of at least a local region of a top surface of the panel so as to melt a relatively thin surface layer of the material in the at least local region, wherein the melted material re-flows and smoothes at least a local region of the top surface of the panel;

wherein said substantially linear heat source comprises a burner nozzle for generating a slot of burning premixed fuel mixture about 1 to about 10 mm in width and wherein the premixed fuel mixture comprises a fuel and oxygen; and wherein both the planar panel and the slot of burning premixed fuel mixture are substantially vertically oriented, and the step of controllably heating comprises:

a) moving the burner nozzle over the top surface of planar panel at a substantially uniform velocity along a path of movement substantially perpendicular to the length of the slot;

b) controlling the distance between the burner nozzle and the top surface of the planar panel;

c) selecting the fuel used in the premixed fuel mixture;

d) controlling the fuel to oxygen mixing ratio;

e) controlling the flow rate of the fuel; and f) controlling the tilt, if any, of the planar panel away from an upper end of the slot of the burning fuel mixture.

2. The method of claim 1, wherein the step of controllably heating includes moving the substantially linear heat source at a substantially uniform rate along a linear path of movement that is not parallel to the length of said heat source.

3. The method of claim 2, wherein the linear path of movement is substantially perpendicular to the length of the heat source.

4. The method of claim 1, wherein said substantially linear heat source comprises a burner nozzle for generating a slot of burning fuel about 1 to about 10 mm in width.

5. The method of claim 1, wherein said substantially linear heat source comprises a diffusion torch in the form of a multiplicity of tubes each having a first end, the first ends of the multiplicity of tubes being arranged in a linear array, and wherein alternating ones of the multiplicity of tubes respectively deliver oxygen and fuel to the first ends thereof.

6. The method of claim 1, wherein said substantially linear heat source comprises a diffusion torch having a channel having a multiplicity of orifices, wherein the channel delivers oxygen and fuel to the multiplicity of orifices thereof.

7. The method of claim 1, wherein the step of controllably heating includes controlling the temperature of the heat source.

8. The method of claim 1, wherein the fuel comprises propane; the fuel to oxygen mixing ratio is approximately 1:3.4; the distance between the burner nozzle and the top surface of the planar panel is approximately 1.3 cm; the fuel flow rate is in the range of 3.6 to 6.8 liters/minute/5 cm of burner nozzle length; and the moving velocity of the burner nozzle with respect to the planar panel is in the range of 0.34 to 0.86 mm/sec.

9. The method of claim 1, wherein the fuel comprises propane; the fuel to oxygen mixing ratio is approximately 1:2.4; the distance between the burner nozzle and the top surface of the planar panel is approximately 1.1 cm; the fuel flow rate is in the range of 4 to 6.8 liters/minute/5 cm of burner nozzle length; and the moving velocity of the burner nozzle with respect to the top surface of the planar panel is in the range of 0.48 to 0.85 mm/sec.

10. The method of claim 1, wherein the fuel comprises propane; the fuel to oxygen mixing ratio is approximately 1:3.9; the distance between the burner nozzle and the top surface of the planar panel is approximately 1.0 cm; the fuel flow rate is in the range of 4.8 to 7.9 liters/minute/5 cm of burner nozzle length; and the moving velocity of the burner nozzle with respect to the top surface of planar panel is in the range of 0.94 to 1.05 mm/sec.

11. The method of claim 1, wherein the fuel comprises propane; the fuel to oxygen mixing ratio is approximately 1:3.3; the distance between the burner nozzle and the top surface of the planar panel is approximately 0.9 cm; the flow rate of the fuel is in the range of 4.0 to 6.2 liters/minute/5 cm of burner nozzle length; and the moving velocity of the burner nozzle with respect to the top surface of the planar panel is in the range of 0.68 to 1.03 mm/sec.

12. The method of claim 1, wherein the fuel comprises acetylene; the fuel to oxygen mixing ratio is approximately 1:1.2; the distance between the burner nozzle and the top surface of the planar panel is approximately 5.8 cm; the flow rate of the fuel is in the range of 1.1 to 1.5 liters/minute/5 cm of burner nozzle length; the moving velocity of the burner nozzle with respect to the top surface of the planar panel is in the range of 5.0 to 6.9 mm/sec; and the tilt of the planar panel away from the upper end of the burner nozzle is approximately 2°.

13. The method of claim 1, the fuel comprises acetylene; the fuel to oxygen mixing ratio is approximately 1:1.2; the distance between the burner nozzle and the top surface of the planar panel is approximately 3.5 cm; the flow rate of the fuel is in the range of 1.1 to 1.6 liters/minute/5 cm of burner nozzle length; the moving velocity of the burner nozzle with respect to the top surface of the planar panel is in the range of 5.0 to 6.9 mm/sec; and the title of the planar panel away from the upper end of the burner nozzle is approximately 2°.

14. The method of claim 1, wherein the band has a width which is about equal to the length of the flame.

* * * * *